(12) United States Patent
Guo et al.

(10) Patent No.: US 12,518,649 B2
(45) Date of Patent: Jan. 6, 2026

(54) SAMPLE SIMULATED SCANNING DEVICE AND USE METHOD

(71) Applicant: BOE Technology Group Co., Ltd., Beijing (CN)

(72) Inventors: Sijia Guo, Beijing (CN); Xinxin Mu, Beijing (CN); Ning Jia, Beijing (CN); Hong Wang, Beijing (CN); Shijie Cao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 705 days.

(21) Appl. No.: 17/921,591

(22) PCT Filed: May 28, 2021

(86) PCT No.: PCT/CN2021/096872
§ 371 (c)(1),
(2) Date: Oct. 26, 2022

(87) PCT Pub. No.: WO2021/244434
PCT Pub. Date: Dec. 9, 2021

(65) Prior Publication Data
US 2023/0169879 A1 Jun. 1, 2023

(30) Foreign Application Priority Data
Jun. 4, 2020 (CN) .......................... 202010500019.8

(51) Int. Cl.
*G09B 5/00* (2006.01)
*G09B 9/00* (2006.01)
*G01R 33/20* (2006.01)

(52) U.S. Cl.
CPC ................ *G09B 9/00* (2013.01); *G01R 33/20* (2013.01)

(58) Field of Classification Search
CPC .......... G09B 9/00; G09B 23/28; G09B 23/30; G01R 33/20
See application file for complete search history.

(56) References Cited

U.S. PATENT DOCUMENTS

| | | | |
|---|---|---|---|
| 2010/0208061 A1 | 8/2010 | Lee et al. | |
| 2015/0140538 A1* | 5/2015 | Savitsky | .............. G09B 23/286 434/262 |

(Continued)

FOREIGN PATENT DOCUMENTS

| | | |
|---|---|---|
| CN | 101799417 A | 8/2010 |
| CN | 109406807 A | 3/2019 |

(Continued)

OTHER PUBLICATIONS

PCT/CN2021/096872 international search report.

*Primary Examiner* — Timothy A Musselman
(74) *Attorney, Agent, or Firm* — IPro, PLLC (57) ABSTRACT

A sample simulated scanning device and a use method. The sample simulated scanning device includes a base, a conveying platform provided on the base, a first interaction means provided in the conveying platform, a controller, and a display means. The conveying platform is configured to convey a biological sample placed on the surface of the conveying platform; a second interaction means is arranged in the biological sample; biological species information is stored in the second interaction means; biological part information is stored in the first interaction means; when the biological sample is conveyed to a position where the second interaction means and the first interaction means carry out communication interaction, on the basis of the biological species information and the biological part information, the controller invokes pre-stored video data match- (Continued)

ing the biological species information and the biological part information, and the display means plays the video data.

20 Claims, 4 Drawing Sheets

(56) References Cited

U.S. PATENT DOCUMENTS

2017/0110032 A1* 4/2017 O'Brien ................ A61B 8/483
2018/0336803 A1* 11/2018 Patil ...................... A61B 8/523

FOREIGN PATENT DOCUMENTS

| | | |
|---|---|---|
| CN | 209154036 U | 7/2019 |
| CN | 111596242 A | 8/2020 |
| JP | 2009213424 A | 9/2009 |
| KR | 20050111088 A | 11/2005 |

* cited by examiner

SAMPLE SIMULATED SCANNING DEVICE AND USE METHOD

CROSS REFERENCE TO RELATED APPLICATIONS

The present disclosure is a National Stage of International Application No. PCT/CN2021/096872, filed on May 28, 2021, which claims priority to the Chinese Patent Application No. 202010500019.8, filed to China Patent Office on Jun. 4, 2020, and entitled "SAMPLE SIMULATED SCANNING DEVICE AND USE METHOD", the entire content of which is incorporated herein by reference.

FIELD

The present disclosure relates to the technical field of display, in particular to a sample simulated scanning device and a use method.

BACKGROUND

Magnetic resonance imaging (MRI) device teaching refers to experiment teaching aiming to emphasize students' operational capacity. It facilitates for students to convert MRI working principle knowledge into practical operational capacity, and plays a key transitional role in theoretical and practical teaching.

SUMMARY

An embodiment of the present disclosure provides a sample simulated scanning device, includes: a base; a conveying platform disposed on the base. The conveying platform is configured to convey a biological sample placed on a surface thereof, a second interaction means is arranged in the biological sample, and biological species information is stored in the second interaction means; a first interaction means disposed in the conveying platform. The biological part information is stored in the first interaction means; a controller electrically connected to the conveying platform and the first interaction means respectively. The controller is configured to invoke pre-stored video data matching the biological species information and the biological part information based on the biological species information and the biological part information, in response to the biological sample being conveyed to a position where the second interaction means and the first interaction means carry out communication interaction, and a display means electrically connected to the controller and configured to play the video data.

Optionally, the first interaction means includes an NFC apparatus, and/or the second interaction means includes an NFC apparatus.

Optionally, the sample simulated scanning device includes a plurality of first interaction means, and the plurality of first interaction means are sequentially arranged in the conveying platform in a conveying direction of the conveying platform.

Optionally, the sample simulated scanning device further includes: a switching apparatus electrically connected to the conveying platform and configured to control the conveying platform to be turned on or off.

Optionally, the sample simulated scanning device further includes: a distance measuring apparatus electrically connected to the controller and arranged at a conveying tail end of the conveying platform; the distance measuring apparatus is configured to sense a distance value between the biological sample placed on the surface of the conveying platform and the distance measuring apparatus; and in response to the conveying platform being turned on under control of the switching apparatus, the controller is further configured to compare the distance value to a first preset threshold and, according to a comparison result, control the conveying platform to convey the biological sample.

Optionally, in response to the distance value being not smaller than the first preset threshold, the controller controls the conveying platform to convey the biological sample.

Optionally, in response to the distance value being smaller than the first preset threshold, the controller is further configured to invoke pre-stored first prompting information to control the display means to display the first prompting information.

Optionally, in response to the conveying platform conveying the biological sample, the controller is further configured to compare the distance value to a second preset threshold and, according to a comparison result, control the conveying platform to stop conveying the biological sample. The second preset threshold is smaller than the first preset threshold.

Optionally, in response to the distance value being smaller than the second preset threshold, the controller controls the conveying platform to stop conveying the biological sample.

Optionally, in response to the distance value being smaller than the second preset threshold, the controller is further configured to invoke pre-stored second prompting information to control the display means to display the second prompting information.

Optionally, the sample simulated scanning device further includes: a data transmission apparatus electrically connected to the controller and configured to transmit the video data to the controller.

Optionally, the sample simulated scanning device further includes: a power supply apparatus configured to supply power to the sample simulated scanning device.

An embodiment of the present disclosure further provides a use method of the sample simulated scanning device described above, includes placing a biological sample on a surface of a conveying platform for conveying; and invoking, by a controller, pre-stored video data matching the biological species information and the biological part information based on biological species information and biological part information, in response to the biological sample being conveyed to a position where a second interaction means and a first interaction means carry out communication interaction, and playing, by a display means, the video data.

DETAILED DESCRIPTION OF THE EMBODIMENTS

Due to volume limits, a domestic MRI device cannot be displayed at science and technology museums or other public spaces at present, and cannot be used as a machine for science popularization at science and technology museums or other public spaces.

In order to make technical solutions and advantages of the present disclosure clearer, implementations of the present disclosure will be further described in detail with reference to the accompanying drawings.

Figure 1:
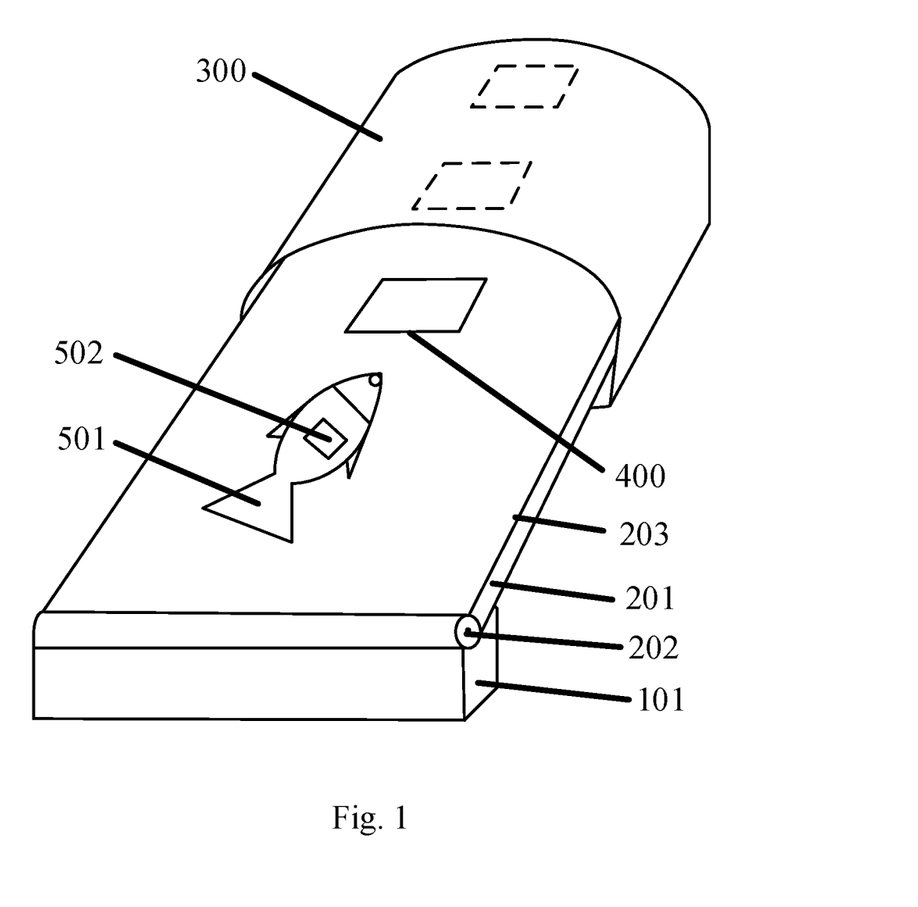
FIG. 1 illustrates a schematic structural diagram of a sample simulated scanning device proposed by an embodiment of the present disclosure.

FIG. 1 illustrates a schematic structural diagram of a sample simulated scanning device proposed by an embodiment of the present disclosure. The sample simulated scanning device in the embodiment mainly aims to simulate a biological tissue scanning process of an MRI device. As shown in FIG. 1, the sample simulated scanning device includes: a base 101, a conveying platform, a first interaction means 400, a controller (not shown in FIG. 1) and a display means 300.

In some embodiments, the conveying platform is arranged on the base 101, and the conveying platform is mainly configured to convey a biological sample 501 placed on a surface thereof. The biological sample 501 may be a biological model. For example, in FIG. 1, the biological sample 501 is a fish model. In an example, the conveying platform may include a conveying plate 201, driving rollers 202 located at two ends of the conveying plate 201, a driving belt 203 arranged on rolling surfaces of the driving rollers 202, and motors configured to drive the driving rollers 202 to move. It should be noted that merely a relevant structure of the driving belt 203, the conveying plate 201 and the driving rollers 202 is shown in FIG. 1, and no specific structure of the motors is shown. Because a specific structure of the conveying platform is not a key point of the present disclosure, the specific structure and a working principle thereof will not be described here.

In the embodiment, a first interaction means 400 is arranged in the conveying platform. The first interaction means 400 may be specifically embedded in a surface of the conveying plate 201. Correspondingly, a second interaction means 502 is arranged in the biological sample 501, and the second interaction means 502 stores biological species information. For example, when the biological sample 501 is the fish model, the biological species information stored in the second interaction means 502 arranged in the fish model corresponds to species information of fish. Similarly, when the biological sample 501 is a bovid model, the biological species information stored in the second interaction means 502 arranged in the bovid model corresponds to species information of bovid. The first interaction means 400 stores biological part information, such as head information, abdomen information or tail information.

In some embodiments, when the first interaction means 400 and the second interaction means 502 are located in a mutual interaction range, they carry out corresponding interaction, so that the controller can, based on the communication interaction between the first interaction means 400 and the second interaction means 502, respectively obtain the biological species information and the biological part information stored in the first interaction means 400 and the second interaction means 502, invoke pre-stored video data matching the biological species information and the biological part information on the basis of the biological species information and the biological part information, and control the display means 300 to play the video data.

In some embodiments, a certain interaction range exists between the first interaction means 400 and the second interaction means 502. In a preset environment, when a distance between the first interaction means 400 and the second interaction means 502 is within the interaction range, the first interaction means 400 and the second interaction means 502 carry out communication interaction, and when the distance between the first interaction means 400 and the second interaction means 502 is beyond the interaction range, the first interaction means 400 and the second interaction means 502 will not carry out communication interaction. In some embodiments, video data of different parts of a plurality of organisms is pre-stored in the controller, such as videos of head, abdomen and tail of fish, and videos of head, abdomen and tail of bovid. When the first interaction means 400 and the second interaction means 502 are located at positions where they can carry out communication interaction with each other, the controller respectively obtains the biological species information and the biological part information based on the interaction therebetween, and searches for matching video data based on the biological species information and the biological part information. For example, when the first interaction means 400 stores fish species information and the second interaction means 502 stores tail information, the controller will search for a fish tail video and play the fish tail video through the display means 300, so that a purpose of simulated scanning is realized. Organizational structures of different parts of different biological samples 501 may be displayed, experience interaction is good, an operability is strong, and a user may better enjoy the fun of manual operation. In the meantime, the user may have a better understanding of medical detection devices and the organizational structures of organisms. The device is simple in structure and convenient to install and, in specific implementation, may be disposed at science and technology museums or other public spaces.

When a related MRI device is in a course of scanning, the biological sample 501 will be placed on a conveying belt of the MRI device to be conveyed. In a course of conveying the biological sample 501, the MRI device will scan a corresponding part of the biological sample 501 located at a scanning position in real time, and generate a corresponding scanning image. That is, for example, when the biological sample 501 is conveyed to a position where its head is located at the scanning position of the MRI device, the MRI device will display a scanning image of the head in real time, and when the biological sample 501 is conveyed to a position where its abdomen is located at the scanning position, the MRI device will display a scanning image of the abdomen in real time.

In order to better simulate a scanning work process of the MRI device, in one implementation of the embodiment, a plurality of first interaction means 400 are arranged, and the plurality of first interaction means 400 are sequentially arranged in the conveying platform in a conveying direction of the conveying platform.

In some embodiments, the plurality of first interaction means 400 store different biological part information, and are sequentially arranged in the conveying platform in the conveying direction, and the biological part information stored in each first interaction means 400 is different from each other. For example, in the example of FIG. 1, three first interaction means 400 are arranged, and the three first interaction means 400 respectively store head information, abdomen information and tail information. In the conveying process of the biological sample 501, the second interaction means 502 arranged in the biological sample 501 will sequentially carry out communication interaction with the plurality of first interaction means 400 respectively, and then through the interaction effect between the second interaction means 502 and the plurality of first interaction means 400, the display means 300 displays videos of different parts of a biological species, so that the user can better experience actual operation of the MRI device during use and a sense of interaction of the user is improved.

In one implementation, a corresponding sequence of the plurality of first interaction means 400 may be set based on a physiological structure of an actual organism. For example, as shown in FIG. 1, the three first interaction means 400 are arranged, and the three first interaction means 400 respectively store the head information, the abdomen information and the tail information. Based on the physiological structure of the actual organism, the abdomen is between the head and the tail. Therefore, the three first interaction means 400 may be arranged in a positive sequence or an inverted sequence of the head information, the abdomen information and the tail information, so that when the biological sample 501 is conveyed on the conveying platform, three videos displayed by the display means 300 can correspond to the actual physiological structure of the actual organism, so that fidelity of simulated scanning is further improved.

In one implementation of the embodiment, the first interaction means 400 and/or the second interaction means 502 includes a near field communication (NFC) apparatus. NFC apparatuses are respectively used as the first interaction means 400 and the second interaction means 502, so that short-distance communication between the first interaction means 400 and the second interaction means 502 can be realized. When there are a plurality of first interaction means 400, because of a characteristic of short-distance communication of NFC, in a course when the second interaction means 502 is carrying out communication interaction with one of the first interaction means 400, communication interference from other first interaction means 400 is avoided, and an accuracy of communication interaction is improved.

Figure 2:
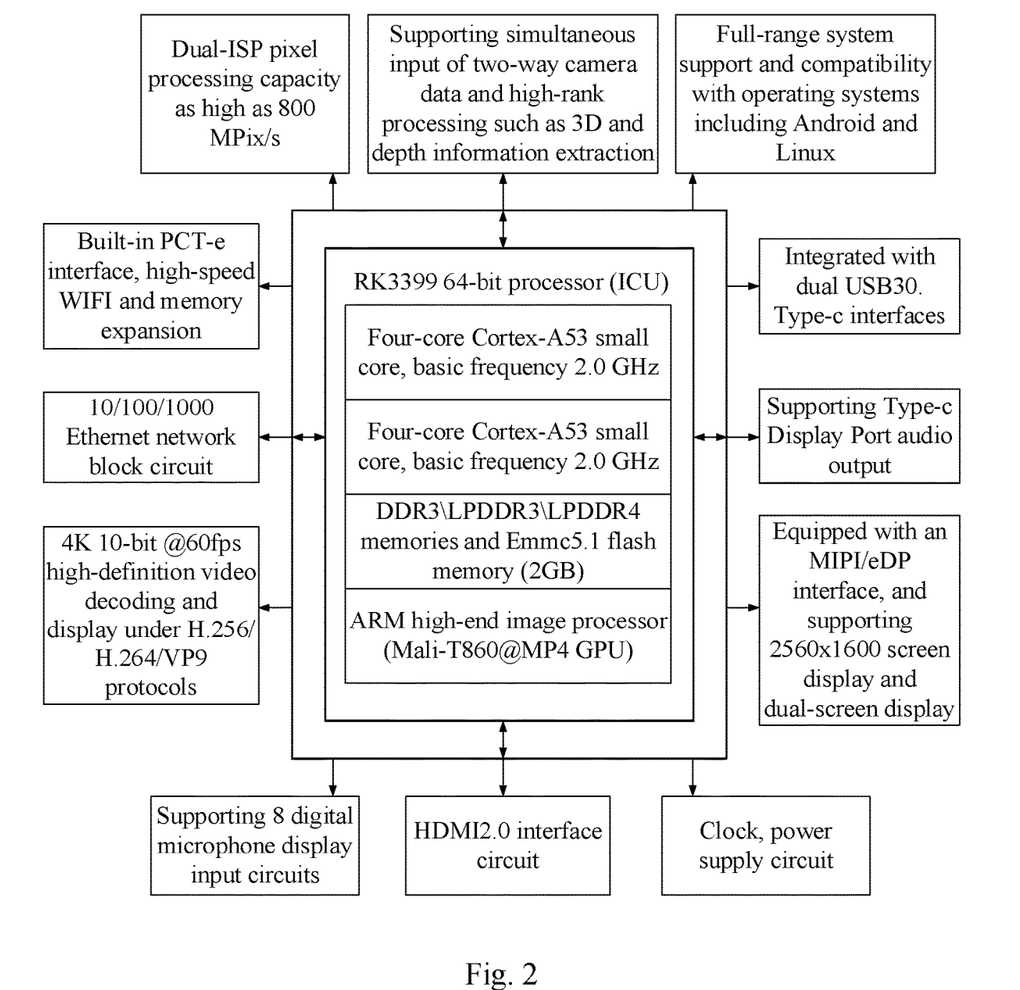
FIG. 2 illustrates a schematic structural diagram of a controller in an embodiment.

In one implementation of the embodiment, because the controller pre-stores the video data of different parts of a plurality of organisms, the controller should be understood as a controlling component with a storing function. For example, the controller may be an RK3399 control card. As shown in FIG. 2, the RK3399 control card is composed of SOCs (multi-core processors of diversified structures) and is a 64-bit six-core processor containing two Cortex-A72 large cores and four Cortex-A53 smaller cores; its maximum basic frequency is 2.0 GHz and it has DDR3LPDDR3LPDDR4 memories and an Emmc5.1 flash memory (2 GB); it is integrated with a new generation of high-end image processor (Mali-T860@MP4GPU) of ARM and is built with Pci-e, high-speed WIFI and memory expansion; it is integrated with dual USB30. Type-c interfaces, and supports Type-c Display Port audio output; it is equipped with an MIPI/Edp interface and supports 2560×1600 screen display and dual-screen display; it is equipped with an HDMI2.0 interface, and supports 4K 10-bit @60 fps high-definition video decoding and display under H.256/H.264/VP9 protocols; its dual-ISP pixel processing capacity is as high as 800 MPix/s, and it supports simultaneous input of two-way camera data and high-rank processing such as 3D and depth information extraction; it supports 8 digital microphone display input circuits; and with full-range system support and compatibility with operating systems including Android and Linux, the RK3399 control card is an intelligent logic control center of different monitoring and management systems as well as a core processor of different systems.

In one implementation of the embodiment, the display means 300 includes a flexible display screen. The flexible display screen may be arranged surrounding a surface of the conveying platform. The flexible display screen may include four flexible sub-display screens, and the four flexible sub-display screens are spliced into the flexible display screen as shown in FIG. 1. In order to realize electric connection with the four flexible sub-display screens, two RK3399 control cards may be adopted simultaneously, and each control card includes two MIPI interfaces, so that each control card may be electrically connected to two flexible sub-display screens simultaneously, so that the flexible display screen displays a corresponding video through control by the controller.

Figure 3:
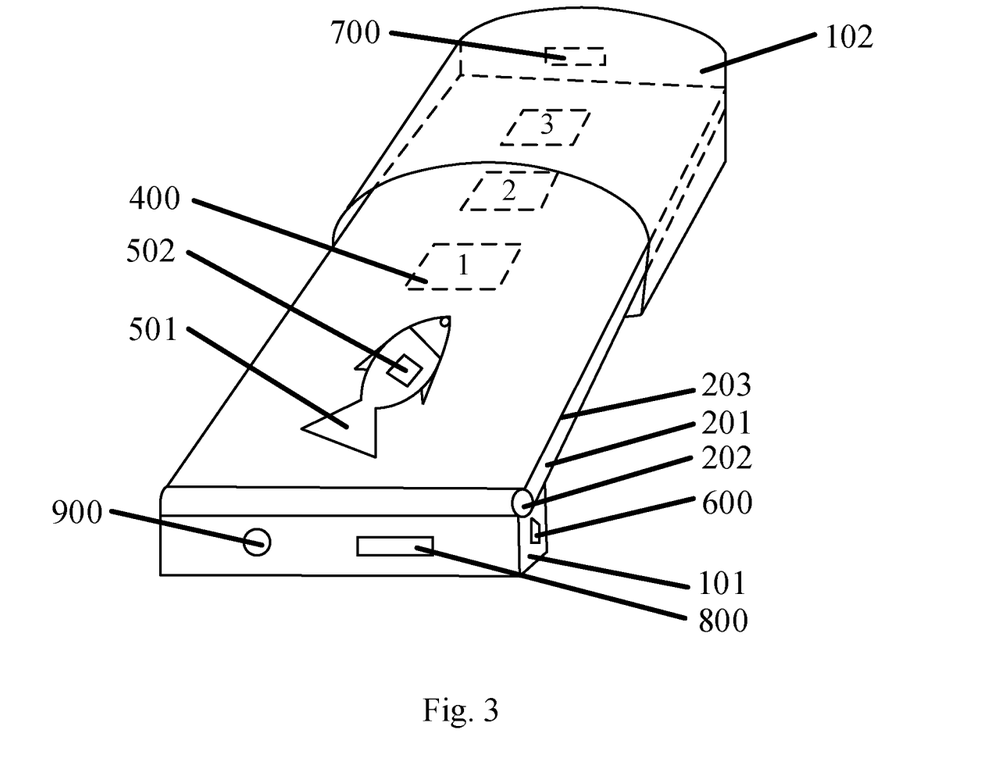
FIG. 3 illustrates a schematic structural diagram of a sample simulated scanning device in an embodiment.

In one implementation of the embodiment, in order to enable the user to manually turn on or off conveying of the conveying platform, as shown in FIG. 3, the sample simulated scanning device in the embodiment further includes a switching apparatus 600 electrically connected to the conveying platform. The switching apparatus 600 may be a touch control type switching apparatus 600 or a push type switching apparatus 600. The switching apparatus 600 may be specifically located on the base 101. It should be noted that, those of skill in the art should be aware that a specific type and a position of the switching apparatus 600 are not limited to the above description, and are not specifically limited in the embodiment.

In a practical application scene, the first interaction means 400 is arranged between a conveying head end of the conveying platform and a conveying tail end of the conveying platform. When the user performs simulated scanning on the biological sample 501, the user should first place the biological sample 501 at a position at the conveying head end of the conveying platform, and then turns on the conveying platform to convey the biological sample 501, so that the biological sample 501 can be conveyed from the conveying head end of the conveying platform to the conveying tail end of the conveying platform. In a conveying process, the user can obtain complete simulated scanning experience through communication interaction between the first interaction means 400 and the second interaction means 502.

When the conveying platform is turned on, because the biological sample 501 is located between the conveying head end and the conveying tail end of the conveying platform, the biological sample 501 cannot be conveyed from the conveying head end of the conveying platform to the conveying tail end of the conveying platform, the user may be unable to enjoy the complete simulated scanning experience. In one implementation of the embodiment, the sample simulated scanning device further includes a distance measuring apparatus 700 electrically connected to the controller. The distance measuring apparatus 700 is arranged at the conveying tail end of the conveying platform, and is mainly configured to sense a distance value between the biological sample 501 placed on the surface of the conveying platform and the distance measuring apparatus 700. When the conveying platform is turned on in response to control by the switching apparatus 600, the controller is further configured to compare the distance value to a first preset threshold and, based on a comparison result, control the conveying platform to convey the biological sample 501.

In some embodiments, when the user turns on the conveying platform through the switching apparatus 600, the controller compares the distance value collected by the distance measuring apparatus 700 to the first preset threshold, and, based on a comparison result, judges whether the biological sample 501 is located between the conveying head end of the conveying platform and the conveying tail end of the conveying platform. Under one circumstance, when the distance value is no smaller than the first preset threshold, the biological sample 501 is not located between the conveying head end of the conveying platform and the conveying tail end of the conveying platform; and at the moment, the controller will control the conveying platform to convey the biological sample 501, and the biological sample 501 can be conveyed from the conveying head end to the conveying tail end in the conveying process, so that the user can obtain complete simulated scanning experience. Under another circumstance, when the distance value is smaller than the first preset threshold, the biological sample 501 is placed between the conveying head end of the conveying platform and the conveying tail end of the conveying platform, and at the moment, the controller will not control the conveying platform to convey the biological sample. The first preset threshold may be set according to a distance between the conveying head end of the conveying platform and the conveying tail end of the conveying platform. The embodiment does not make any limitation on a specific value of the first preset threshold. In one example, the first preset threshold may be 20 cm.

In order to further realize a purpose of reminding the user, in one implementation of the embodiment, when the distance value is smaller than the first preset threshold, the controller is further configured to invoke pre-stored first prompting information and control the display means 300 to display the first prompting information.

In some embodiments, the first prompting information may be written information that can be displayed on the display means 300. The written information may specifically be "Please place the biological sample 501 at the correct location". In this way, by displaying the first prompting information on the display means 300, the user can be reminded of placing the biological sample 501 at the conveying head end of the conveying platform.

In one implementation of the embodiment, when the conveying platform conveys the biological sample 501, the controller is further configured to compare the distance value to a second preset threshold and, according to a comparison result, control the conveying platform to stop conveying the biological sample 501. The second preset threshold is smaller than the first preset threshold.

In some embodiments, when the conveying platform conveys the biological sample 501, the controller may further compare the distance value sensed by the distance measuring apparatus in real time to the second preset threshold, and, according to a comparison result, judge whether the biological sample 501 is about to arrive at the conveying tail end or has arrived at the conveying tail end. Under one circumstance, when the distance value is smaller than the second preset threshold, the biological sample 501 is about to arrive at the conveying tail end or has arrived at the conveying tail end; and at the moment, the controller controls the conveying platform to stop conveying the biological sample 501. The second preset threshold may be set according to a distance between the conveying head end of the conveying platform and the conveying tail end of the conveying platform. The embodiment does not make any limitation on a specific value of the second preset threshold. In one example, the second preset threshold may be 5 cm.

When the biological sample 501 is conveyed to a position with a distance value smaller than the second preset threshold, the controller controls the conveying platform to stop conveying the biological sample 501, so that a complete simulated scanning process is achieved. In order to realize a purpose of reminding the user, in one implementation of the embodiment, when the distance value is smaller than the second preset threshold, the controller is further configured to invoke pre-stored second prompting information and control the display means 300 to display the second prompting information.

In some embodiments, the second prompting information may be written information that can be displayed on the display means 300. The written information may specifically be "Scanning complete, please take the biological sample out of the conveying platform". In this way, by displaying the second prompting information on the display means 300, the user can be reminded that the simulated scanning process of the biological sample 501 has been finished.

In one implementation of the embodiment, a baffle 102 is arranged at the conveying tail end of the conveying platform, and the baffle 102 can achieve an effect of protecting the biological sample 501 and prevent the biological sample 501 from falling onto the ground in the conveying process, so as to improve protection of the biological sample 501. The baffle 102 may be integrally formed on the base 101, and the abovementioned distance measuring apparatus 700 may be correspondingly installed on a surface of the baffle 102. In one example, a vertical distance between the distance measuring apparatus 700 and the surface of the conveying platform may be set to be 1 cm.

It should be noted that, in the embodiment, the distance measuring apparatus 700 may be an infrared distance measurement sensor. When the infrared distance measurement sensor is performing distance measurement work, the infrared distance measurement sensor may emit an infrared ray to a surface of a to-be-detected object; after the emitted infrared ray is reflected by the surface of the to-be-detected object, the reflected infrared ray will be received by the infrared distance measurement sensor; and a horizontal distance between the infrared distance measurement sensor and the to-be-detected object is correspondingly calculated based on data of a time difference between emitting the infrared ray and receiving the infrared ray.

In one implementation of the embodiment, the sample simulated scanning device further includes: a data transmission apparatus 800 electrically connected with the controller and configured to transmit the vide data to the controller.

In some embodiments, the data transmission apparatus 800 may be a USB (Universal Serial Bus) apparatus. In the embodiment, when the controller is the RK3399 control card, the data may be transmitted to the controller through the USB apparatus. The data may contain the transmitted "video data", and the data transmission apparatus 800 may be used by the controller for upgrading firmware and debugging.

In one implementation of the embodiment, the sample simulated scanning device further includes: a power supply apparatus 900, configured to supply power to the sample simulated scanning device.

In some embodiments, the power supply apparatus 900 may be a storage battery. The power supply apparatus 900 can supply power to the sample simulated scanning device in the embodiment, so that the sample simulated scanning device is powered on to work.

Figure 4:
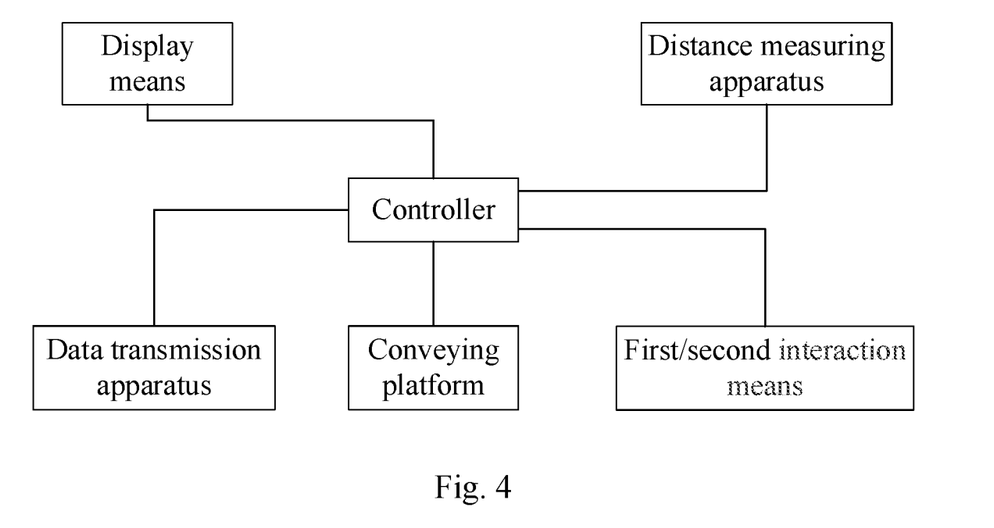
FIG. 4 illustrates a schematic diagram of electric connection between a controller and various apparatuses and components in an embodiment.

An example in FIG. 4 shows a schematic diagram of electric connection between a controller and various apparatuses and components. It can be seen from FIG. 4 that, the controller is electrically connected to the display means 300, the data transmission apparatus 800, the conveying platform, the first/second interaction means 502 and the distance measuring apparatus 700 respectively, so that an effect of receiving data and controlling is achieved.

Figure 5:
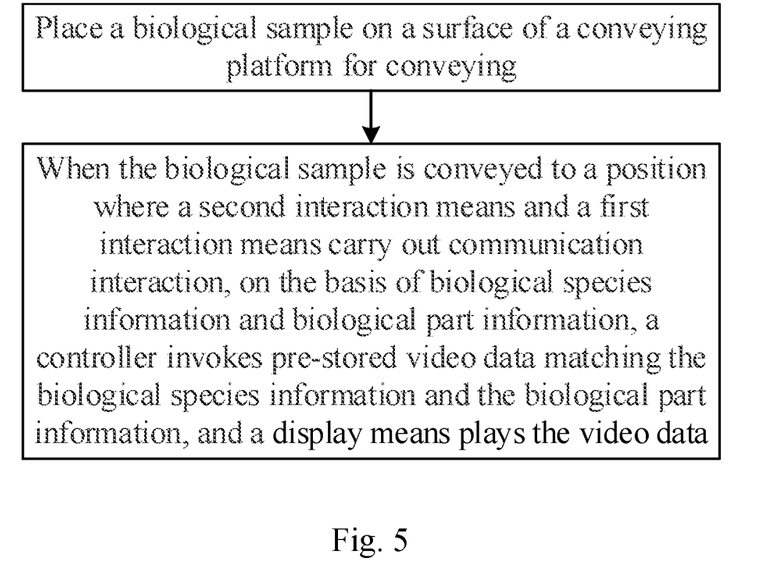
FIG. 5 illustrates a flow chart of a use method for using a sample simulated scanning device proposed by an embodiment of the present disclosure.

FIG. 5 illustrates a flow chart of a use method for using a sample simulated scanning device proposed by an embodiment of the present disclosure. As shown in FIG. 5, the use method includes the following steps:

S100, a biological sample 501 is placed on a surface of a conveying platform to be conveyed; and S200, when the biological sample 501 is conveyed to a position where a second interaction means 502 and a first interaction means 400 carry out communication interaction, on the basis of biological species information and biological part information, a controller invokes pre-stored video data matching the biological species information and the biological part information, and a display means 300 plays the video data.

Embodiments is further introduced below with reference to FIG. 3, FIG. 5 and practical application scenes.

Before performing a simulated scanning process, relevant video data may be pre-stored in the controller. Then, a conveying speed of the conveying platform is set to be constant, and because the conveying speed is fixed, a position of the first interaction means 400 may be correspondingly set according to a conveying position of the biological sample 501. For example, in FIG. 3, a position 1, a position 2 and a position 3 are arranged on the conveying platform. First interaction means 400 are correspondingly arranged at the position 1, the position 2 and the position 3. Each first interaction means 400 stores different biological part information. The first interaction means 400 at the position 1 stores head information, the first interaction means 400 at the position 2 stores abdomen information and the first interaction means 400 at the position 3 stores tail information. Finally, the biological sample 501 is placed on the surface of the conveying platform. The biological sample 501 may be a fish sample, and the second interaction means 502 arranged in the biological sample 501 stores corresponding biological species information of fish.

When the simulated scanning process is performed, the biological sample 501 will be conveyed by the conveying platform to arrive at the position 1, the position 2 and the position 3 sequentially. when the biological sample 501 arrives at the position 1, the second interaction means 502 arranged in the biological sample 501 will carry out communication interaction with the first interaction means 400 at the position 1, and on the basis of the biological species information stored in the second interaction means 502 arranged in the biological sample 501 and head information stored in the first interaction means 400 at the position 1, the controller will invoke corresponding video data (i.e. head scanning video of fish), so that the display means 300 displays the data. Similarly, when the biological sample 501 is conveyed to the position 2 and the position 3, the controller invokes corresponding videos to control the display means 300 to display, so that the complete simulated scanning process is finished.

If a user turns off the conveying platform in a process that the conveying platform conveys the biological sample 501, and the biological sample 501 is conveyed to a certain point between the position 1 and the position 2 (it should be understood here that the second interaction means 502 arranged in the biological sample 501 and the first interaction means 400 at the position 1 and the position 2 do not carry out communication interaction), the video being played by the display means 300 will be automatically paused, and then the user moves the biological sample 501 to the position 2 (that is, the second interaction means 502 in the biological sample 501 carries out communication interaction with the first interaction means 400 at the position 2). At the moment, the conveying platform is turned on, and the display means 300 will automatically skip to play abdomen scanning video of fish, instead of continuing to play the previous video.

Apparently, the above embodiments of the present disclosure merely serve as examples for clearly describing the present disclosure, instead of limitation to the implementations of the present disclosure whatsoever. For those of skill in the art, various changes and modifications of different forms may be made on the basis of the above description, and such implementations cannot be exhausted here. As such, provided that these modifications and variations of the present disclosure fall within the scope of the claims of the present disclosure and their equivalents, the present disclosure is also intended to cover such modifications and variations.

What is claimed is:

1. A sample simulated scanning device, comprising:
a base;
a conveying platform disposed on the base, wherein the conveying platform is configured to convey a biological sample placed on a surface thereof, a second interaction means is arranged in the biological sample, and biological species information is stored in the second interaction means;
a first interaction means disposed in the conveying platform, wherein biological part information is stored in the first interaction means;
a controller electrically connected to the conveying platform and the first interaction means respectively, wherein the controller is configured to invoke pre-stored video data matching the biological species information and the biological part information based on the biological species information and the biological part information, in response to the biological sample being conveyed to a position where the second interaction means and the first interaction means carry out communication interaction; and
a display means electrically connected to the controller and configured to play the video data.

2. The sample simulated scanning device according to claim 1, wherein
the first interaction means comprises a Near Field Communication (NFC) apparatus, and/or the second interaction means comprises a Near Field Communication (NFC) apparatus.

3. The sample simulated scanning device according to claim 1, comprising a plurality of the first interaction means, and the plurality of the first interaction means are sequentially arranged in the conveying platform in a conveying direction of the conveying platform.

4. The sample simulated scanning device according to claim 1, further comprising: a switching apparatus electrically connected to the conveying platform and configured to control the conveying platform to be turned on or off.

5. The sample simulated scanning device according to claim 4, further comprising: a distance measuring apparatus electrically connected to the controller and arranged at a conveying tail end of the conveying platform; wherein
the distance measuring apparatus is configured to sense a distance value between the biological sample placed on the surface of the conveying platform and the distance measuring apparatus; and the controller is further configured to compare the distance value to a first preset threshold and control the conveying platform to convey the biological sample according to a first comparison result in response to the conveying platform being turned on under control of the switching apparatus.

6. The sample simulated scanning device according to claim 5, wherein in response to the distance value being not smaller than the first preset threshold, the controller controls the conveying platform to convey the biological sample.

7. The sample simulated scanning device according to claim 5, wherein in response to the distance value being smaller than the first preset threshold, the controller is further configured to invoke a pre-stored first prompting information and control the display means to display the pre-stored first prompting information.

8. The sample simulated scanning device according to claim 5, wherein the controller is further configured to compare the distance value to a second preset threshold and control the conveying platform to stop conveying the biological sample according to a second comparison result, in response to the conveying platform conveying the biological sample, wherein the second preset threshold is smaller than the first preset threshold.

9. The sample simulated scanning device according to claim 8, wherein the controller controls the conveying platform to stop conveying the biological sample in response to the distance value being smaller than the second preset threshold.

10. The sample simulated scanning device according to claim 9, wherein in response to the distance value being smaller than the second preset threshold, the controller is further configured to invoke a pre-stored second prompting information and control the display means to display the pre-stored second prompting information.

11. The sample simulated scanning device according to claim 1, further comprising: a data transmission apparatus electrically connected to the controller and configured to transmit the video data to the controller.

12. The sample simulated scanning device according to claim 1, further comprising: a power supply apparatus configured to supply power to the sample simulated scanning device.

13. A method of using the sample simulated scanning device according to claim 1, comprising:
   placing a biological sample on a surface of a conveying platform for conveying; and
   invoking, by a controller, pre-stored video data matching the biological species information and the biological part information, based on the biological species information and the biological part information, in response to the biological sample being conveyed to a position where a second interaction means and a first interaction means carry out communication interaction, and
   playing, by a display means, the video data.

14. The method according to claim 13, wherein before the invoking, by a controller, pre-stored video data matching the biological species information and the biological part information, the method further comprising:
   comparing, by the controller, a distance value to a first preset threshold and controlling the conveying platform to convey the biological sample according to a first comparison result in response to the conveying platform being turned on.

15. The method according to claim 14, wherein the distance value represents a distance between the biological sample placed on the surface of the conveying platform and a distance measuring apparatus electrically connected to the controller and arranged at a conveying tail end of the conveying platform, and is sensed by the distance measuring apparatus.

16. The method according to claim 15, wherein in response to the distance value being not smaller than the first preset threshold, controlling the conveying platform to convey the biological sample.

17. The method according to claim 15, wherein in response to the distance value being smaller than the first preset threshold, invoking a pre-stored first prompting information and controlling the display means to display the pre-stored first prompting information.

18. The method according to claim 15, wherein in response to the conveying platform conveying the biological sample, comparing, by the controller, the distance value to a second preset threshold, and controlling the conveying platform to stop conveying the biological sample according to a second comparison result, in response to the conveying platform conveying the biological sample, wherein the second preset threshold is smaller than the first preset threshold.

19. The method according to claim 18, wherein controlling the conveying platform to stop conveying the biological sample in response to the distance value being smaller than the second preset threshold.

20. The method according to claim 19, further comprising: invoking a pre-stored second prompting information in response to the distance value being smaller than the second preset threshold, and controlling the display means to display the pre-stored second prompting information.

* * * * *